E. HAWKINS.
HORSE COLLAR FASTENER.
APPLICATION FILED DEC. 13, 1919.
1,431,951.
Patented Oct. 17, 1922.
Fig. I.
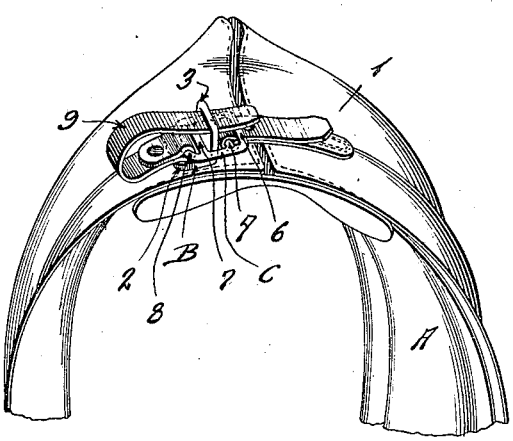
Fig. II.
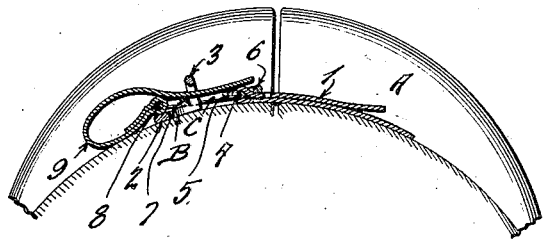
Fig. III.
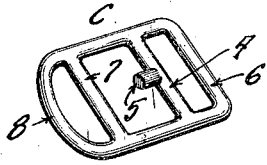
Fig. IV.
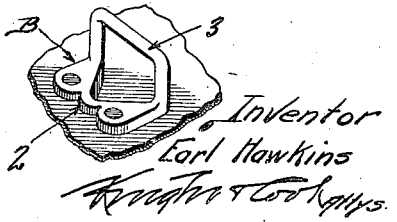
Inventor
Earl Hawkins Patented Oct. 17, 1922.

1,431,951

UNITED STATES PATENT OFFICE.

EARL HAWKINS, OF SPRINGFIELD, MISSOURI, ASSIGNOR TO SIMMONS HARDWARE COMPANY, OF ST. LOUIS, MISSOURI, A CORPORATION OF MISSOURI.

HORSE-COLLAR FASTENER.

Application filed December 13, 1919. Serial No. 344,563.

*To all whom it may concern:*

Be it known that I, EARL HAWKINS, a citizen of the United States of America, a resident of Springfield, in the county of Greene, State of Missouri, have invented certain new and useful Improvements in Horse-Collar Fasteners, of which the following is a full, clear, and exact description, reference being had to the accompanying drawings, forming a part of this specification.

My invention relates to a device for fastening the separable ends of horse collars, the invention having for its object to provide a very simple fastener including slip means for keying the connecting parts, as distinguished from the use of a buckle, and which permits of the fastener being manipulated with extreme ease in either connecting or disconnecting the parts.

Fig. I is a perspective of the upper portion of a horse collar provided with my fastener.

Fig. II is a cross section through the upper portion of the collar and fastener.

Fig. III is a perspective of the fastener clip.

Fig. IV is a perspective of the fastener loop.

The horse collar A shown in the drawings may be of any usual structure, the ends of the collar being separable to facilitate the application of the collar to a horse or other draft animal.

A chape 1 is secured at one of its ends to one end of the collar A, and the other end of the collar has secured to it a keeper B which comprises a base member 2 and an upstanding loop 3, said keeper being most plainly shown in Fig. IV.

C designates a clip secured directly to the chape 1 in a manner to be hereinafter described, said clip being applicable to the loop 3 of the keeper B. The clip C is preferably substantially rectangular in shape (see Fig. III) and includes a cross bar 4 to which the chape 1 is secured, said cross bar being provided with a tongue 5 adapted to extend into any one of a series of holes in the free end of the chape to permit adjustment of the clip relative to the chape. The clip is formed with a rear cross bar 6, which overlies and confines the free end of the chape, and also includes a forward cross bar 7 parallel with the cross bar 4, but spaced therefrom, thereby providing an eye between said cross bars 4 and 7 into and through which the upstanding loop of the keeper B may extend when the fastener parts are connected. A cross bar 8 at the front end of the clip C is spaced from the cross bar 7.

9 designates a key strap secured to the foremost cross bar 8 of the clip C, said strap being of sufficient length to be bowed backwardly above the clip C and have its free end extended through the upstanding loop of the keeper B.

In the use of my horse collar fastener the parts are easily and quickly joined to each other by applying the clip C to the loop of the keeper B, so that said keeper extends through and above said clip, and then inserting the free end of the key strap 9 through the keeper loop, as seen in Figs. I and II. The unfastening operation is likewise simple and easily performed, involving merely the withdrawal of the key strap 9 from the keeper and the lifting of the clip C from said keeper.

I claim:

A horse collar fastener comprising a keeper and a chape secured to opposing separable ends of a horse collar, said keeper having an upstanding loop, said chape having a perforation in its free end, a clip having a cross bar provided with a tongue projecting into said perforation, said clip also having a cross bar in alinement with said first mentioned cross bar overlying and confining the free end of said chape and an eye adapted to receive the loop of said keeper, said tongue being located in said eye, and a key strap secured to said clip and having its free end inserted through the upstanding loop of said keeper and over said clip to hold said clip in position.

In testimony that I claim the foregoing I hereunto affix my signature.

EARL HAWKINS.